United States Patent
Disaro

(10) Patent No.: US 12,498,458 B2
(45) Date of Patent: Dec. 16, 2025

(54) CALIBRATION METHOD AND CALIBRATION SYSTEM FOR A VEHICLE SENSOR

(71) Applicant: Robert Bosch GmbH, Stuttgart (DE)

(72) Inventor: Mauro Disaro, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 314 days.

(21) Appl. No.: 18/251,591

(22) PCT Filed: Oct. 21, 2021

(86) PCT No.: PCT/EP2021/079238
§ 371 (c)(1),
(2) Date: May 3, 2023

(87) PCT Pub. No.: WO2022/096281
PCT Pub. Date: May 12, 2022

(65) Prior Publication Data
US 2023/0400552 A1 Dec. 14, 2023

(30) Foreign Application Priority Data
Nov. 6, 2020 (DE) ................. 10 2020 213 980.6

(51) Int. Cl.
*G01S 7/40* (2006.01)
*G01S 13/931* (2020.01)

(52) U.S. Cl.
CPC .......... *G01S 7/4082* (2021.05); *G01S 13/931* (2013.01); *G01S 2013/93271* (2020.01)

(58) Field of Classification Search
CPC ............... G01S 7/4082; G01S 13/931; G01S 2013/93271; G01S 7/4026; G01S 17/931
See application file for complete search history.

(56) References Cited

U.S. PATENT DOCUMENTS 6,020,844 A * 2/2000 Bai ...................... G01S 7/4026
342/75
9,952,317 B2 * 4/2018 Valois ................... G01S 17/931
(Continued)

FOREIGN PATENT DOCUMENTS

| DE | 102018209709 A1 | 12/2019 |
| DE | 102018215320 A1 | 3/2020 |
| DE | 112019000846 T5 | 10/2020 |

OTHER PUBLICATIONS

International Search Report for PCT/EP2021/079238, Issued Jan. 14, 2022.

*Primary Examiner* — Bernarr E Gregory
(74) *Attorney, Agent, or Firm* — NORTON ROSE FULBRIGHT US LLP

(57) ABSTRACT

A calibration method for a vehicle sensor. The method includes: situating a calibration device having at least one reference object in a field of view of the vehicle sensor, which is situated on a vehicle, ascertaining a first relative position of the calibration device relative to the vehicle through a measurement outside the vehicle, acquisition of the at least one reference object by the vehicle sensor, and determining a second relative position of the at least one reference object relative to the vehicle from acquisition data of the vehicle sensor, and calculating a deviation between the first relative position and the second relative position, the calibration method being terminated if the calculated deviation is already within a predetermined tolerance and a complete calibration of the vehicle sensor being carried out only if the calculated deviation is outside the predetermined tolerance.

10 Claims, 3 Drawing Sheets

(56) References Cited

U.S. PATENT DOCUMENTS

| | | | | |
|---|---|---|---|---|
| 2003/0090411 A1* | 5/2003 | Haney | ............... | G01S 7/4026 342/174 |
| 2004/0239557 A1* | 12/2004 | Tokutsu | ............... | G01S 7/4026 342/174 |
| 2008/0012752 A1* | 1/2008 | Okamura | ............... | G01S 13/931 342/165 |
| 2010/0076709 A1* | 3/2010 | Hukkeri | ............... | G01S 13/931 356/6 |
| 2015/0301159 A1* | 10/2015 | Scheschko | ............... | G01S 7/4026 342/174 |
| 2016/0377702 A1* | 12/2016 | Yomo | ............... | G01S 13/931 342/173 |
| 2018/0372841 A1 | 12/2018 | Hieida et al. | | |
| 2019/0204425 A1* | 7/2019 | Abari | ............... | G01S 13/931 |
| 2019/0204427 A1* | 7/2019 | Abari | ............... | G01S 17/931 |
| 2020/0174107 A1* | 6/2020 | Briggs | ............... | G01S 17/931 |
| 2020/0191927 A1 | 6/2020 | Lin | | |
| 2020/0363500 A1* | 11/2020 | Lau | ............... | G01S 13/931 |

\* cited by examiner

CALIBRATION METHOD AND CALIBRATION SYSTEM FOR A VEHICLE SENSOR

FIELD

The present invention relates to a calibration method and calibration system for a vehicle sensor.

BACKGROUND INFORMATION

Modern motor vehicles often have a series of sensors that support the driver in the recognition of the surrounding environment. For example, the use of a camera, radar system, LIDAR system or the like associated with a driver assistance system is conventional. It is standard for sensors with a more or less strongly directional acquisition range to be calibrated to ensure correct functioning. Calibration can be performed during final assembly or just before delivery of the vehicle, as well as during repair or maintenance of the vehicle.

It is conventional to calibrate a radar sensor of a vehicle by positioning a calibration device in a particular orientation with respect to the vehicle on which the radar sensor is mounted, and subsequently acquiring the actual position of the calibration device and initiating a calibration process of the radar sensor. If the calibration data acquired by the radar sensor are within a predetermined tolerance based on the acquired position of the calibration device, the calibration process can be terminated. During the calibration process, it may be necessary to manually adjust the orientation of the radar sensor one or multiple times to achieve the desired result. This is complicated and therefore cost-intensive.

SUMMARY

It is an object of the present invention to provide a calibration method and/or a calibration system in which a calibration can be accelerated and/or simplified.

This object may be achieved by a calibration method with the features of present invention. Advantageous embodiments and further developments can be learned from the disclosure herein.

According to an example embodiment of the present invention, a calibration method for a vehicle sensor is proposed, having the steps of situating a calibration device having at least one reference object in a field of view of the vehicle sensor, which is situated on a vehicle, ascertaining a first relative position of the calibration device relative to the vehicle through a measurement outside the vehicle, acquiring the at least one reference object by the vehicle sensor, and determining a second relative position of the at least one reference object relative to the vehicle from acquisition data of the vehicle sensor, and calculating a deviation between the first relative position and the second relative position, the calibration method being terminated if the calculated deviation is already within a predetermined tolerance and a complete calibration of the vehicle sensor being carried out only if the calculated deviation is outside the predetermined tolerance.

The calibration method according to the present invention is consequently characterized by the fact that a complete calibration can be skipped if a specified precondition has already been fulfilled before the calibration. The complete calibration would involve a plurality of successive measurement processes, memory processes, and changes to the orientation of the vehicle sensor, which are time-consuming as a whole. It is to be noted that most vehicle sensors, and in particular radar sensors, already have preset calibration data. These could include, inter alia, a positioning of a calibration device necessary for the calibration. Radar sensors that are arranged at the front of a vehicle and have a forward-facing field of view often prescribe a particular relative position of a calibration device with reference objects situated on it. For the calibration of the radar sensor, it is therefore common in the existing art to position the calibration device very precisely in front of the vehicle in the field of view of the radar sensor. A common calibration procedure checks, inter alia, an exact alignment of the calibration device and aborts unsuccessfully if the alignment is inaccurate. The calibration data may further include data necessary for the evaluation of the radar sensor in driving operation, which are a function of a position and orientation of the radar sensor on the vehicle.

According to the present invention, however, such a complete calibration is preceded by a validation step. This is applicable to most vehicle sensors with a field of view and a calibration requirement. In order to be able to carry out the validation step, it is necessary that the acquisition of a reference object can take place separately from the storage of calibration data. Consequently, the vehicle, or a control unit situated therein and connected to the relevant vehicle sensor, should be capable of acquiring the relevant reference object via the vehicle sensor and providing acquisition data without storing calibration data based on the acquisition data in the vehicle sensor. The acquisition data can be used for the validation step.

According to an example embodiment of the present invention, the validation step now includes acquiring a first relative position between the calibration device and the vehicle by a measurement that is done outside the vehicle. This can be done by an external observation device or by the calibration device itself. Subsequently, the acquisition of the at least one reference object by the vehicle sensor takes place. From this a second relative position can be ascertained, which is then to be compared with the first relative position. It can be useful to transform the relative positions ascertained in each case into a suitable format or a suitable number space before the comparison, to enable comparability.

If this comparison already shows that the first relative position and the second relative position are identical within a predetermined tolerance, then the vehicle sensor can already be considered sufficiently calibrated. The calibration data in the vehicle sensor can be used for the vehicle sensor during driving operation. Neither new calibration data nor mechanical realignment of the vehicle sensor are required. Consequently, the calibration of the vehicle sensor is complete when the validation is successful.

Since the validation only requires acquisition data from the vehicle sensor, the validation can be performed very quickly and with an only roughly positioned calibration device. The particular advantage of the calibration method according to the present invention lies in its possible time-saving potential, because during final assembly it is always to be expected that vehicle sensors have already been properly calibrated after their installation and with standard calibration data that are already available. If this is not the case, a complete calibration is carried out. Overall, the time outlay required for a large number of successive calibration procedures of a large number of vehicle sensors of a large number of vehicles is significantly reduced.

According to an example embodiment of the present invention, particularly preferably, the situation of the calibration device includes coarse alignment of the at least one reference object completely within the field of view of the vehicle sensor. To carry out the validation step, an exact position of the at least one reference object is not required as long as the vehicle sensor is capable of acquiring the at least one reference object. From the acquisition, the second relative position can already be ascertained, which can be compared with the first relative position. The only rough alignment of the at least one reference object can significantly reduce the time spent compared to complete calibration with exact positioning.

As stated above, the acquisition of the at least one reference object by the vehicle sensor includes the maintaining of preset calibration data of the vehicle sensor. Consequently, the calibration data of the vehicle sensor stored in the vehicle sensor itself or in a vehicle control unit are not changed. This procedure differs from a fairly common process in calibrating the vehicle sensor, in which after a calibration iteration a storing of updated calibration data takes place.

According to an example embodiment of the present invention, preferably, the first relative position is ascertained by the calibration device. This is particularly advantageous because the time outlay can be reduced still further. Setting up the calibration device in the field of view of the vehicle sensor is already sufficient as preparation for ascertaining the first relative position. In this case, the calibration device must already be capable of carrying out such a measurement.

In addition, according to an example embodiment of the present invention, the ascertaining of the first relative position can be done by an additional observation device situated outside the calibration device and outside the vehicle. Thus, a stationary, simple calibration device could be sufficient to carry out the method according to the present invention. The observation device situated outside the vehicle could be specifically designed to determine the relative position between the calibration device and the vehicle, and to use for example a laser-supported method for this purpose. The calibration device can thus be less expensive overall, and at the same time a very high degree of accuracy in the ascertaining of the first relative position could be achieved by using the observation device situated outside the vehicle.

Furthermore, before the ascertaining of the first relative position, the position of the vehicle can be fixed and the vehicle can be prepared for calibration. Here various operations could be carried out, including for example setting a particular state of suspension struts of the vehicle and at the same time including preparations of a vehicle-internal electronics system.

In an advantageous specific embodiment of the present invention, before the ascertaining of the first and second relative position a validation position tolerance between the calibration device and the vehicle is checked, and if there is a deviation of the validation position tolerance the relative position between the vehicle and the calibration device is adjusted. For the positioning of the calibration device and the vehicle relative to each other, only a fairly rough tolerance has to be maintained, so that the calibration device can be sensed by the vehicle sensor. For this purpose, the validation position tolerance could be provided, which can be maintained by various measures. For example, for this purpose positioning the vehicle within a certain marking on the ground could be sufficient if the calibration device is stationary.

Analogously, the present invention relates to a calibration system for a vehicle sensor. According to an example embodiment of the present invention, the calibration system includes a calibration device having at least one reference object for situation in a field of view of the vehicle sensor, which is situated on a vehicle, and at least one control unit capable of being coupled to the calibration device and to the vehicle sensor, the calibration device or an external observation device being designed to ascertain a first relative position of the calibration device relative to the vehicle by a measurement outside the vehicle, the vehicle sensor being designed to acquire the at least one reference object by the vehicle sensor, the at least one control unit being designed to ascertain a second relative position of the at least one reference object relative to the vehicle from acquisition data of the vehicle sensor and to calculate a deviation between the first relative position and the second relative position, the calibration system being designed to initiate a release signal for releasing the vehicle if the calculated deviation is already within a predetermined tolerance and to carry out a complete calibration of the vehicle sensor only if the calculated deviation is outside the predetermined tolerance.

In an advantageous specific embodiment of the present invention, the at least one control unit is connectable to a vehicle control unit connected to the vehicle sensor, the at least one control unit being designed to receive acquisition data from the vehicle control unit. The vehicle control unit communicates with the vehicle sensor, which provides raw data or prepared data to the vehicle control unit. For example, the vehicle control unit can be connected to the at least one control unit via an on-board diagnostic connector in order to communicate the vehicle sensor data to the outside and to completely carry out the validation step.

The at least one control unit could be situated in the calibration device. Alternatively, it could be provided externally for this purpose. The at least one control unit can be connected to a display screen, and can receive signals from the at least one control unit providing information about the status and degree of success of the validation step and/or of the complete calibration.

Further measures that improve the present invention are described in more detail below together with the description of preferred exemplary embodiments of the present invention on the basis of figures.

DETAILED DESCRIPTION OF EXAMPLE EMBODIMENTS

Figure 1:
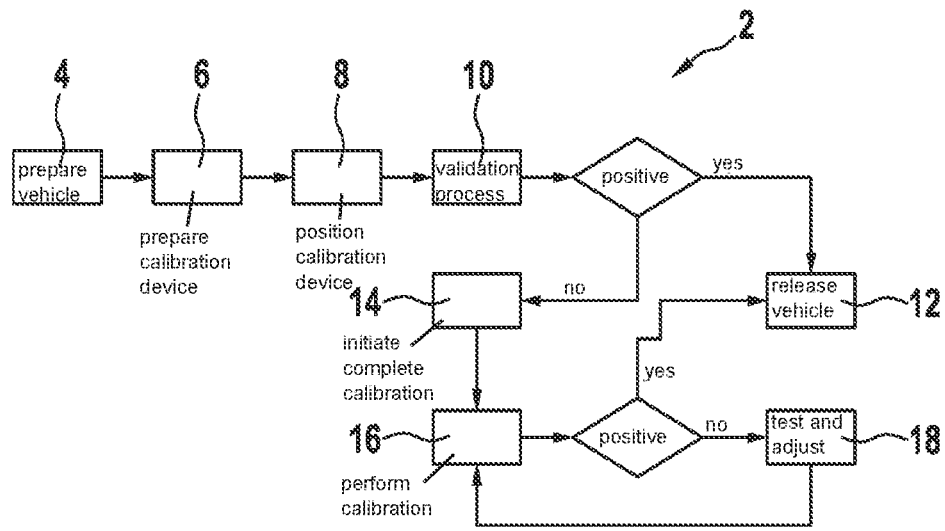
FIG. 1 shows a block diagram of a method according to an example embodiment of the present invention.

FIG. 1 shows a calibration method 2 for a vehicle sensor (not shown). As an example, the process begins here with a preparation 4 of the relevant vehicle (not shown). This can include selecting a predetermined procedure of a vehicle-internal electronics system for calibration. In addition, this could include fixing the position of the vehicle. As an example, suspension struts, which have an adjustable spring and/or damping behavior, could assume a predetermined state in order to permit a representative measurement. Subsequently, a calibration device (not shown) is prepared 6. This can include, for example, its commissioning. The calibration device is then positioned roughly in front of the vehicle 8 so that it is in the field of view of the vehicle sensor.

A validation process 10 is then carried out. If this is positive, the vehicle can be released 12. However, if validation process 10 is not positive, a complete calibration 14 is initiated. This includes, inter alia, performing a calibration step 16. If the result of this is positive, the vehicle can be released 12 as calibrated. If it is negative, testing and adjustment 18 can take place, followed by another calibration step 16.

However, the preceding validation process 10 can in principle speed up the calibration as a whole if the vehicle sensor is already placed with sufficient accuracy after its integration.

Figure 2:
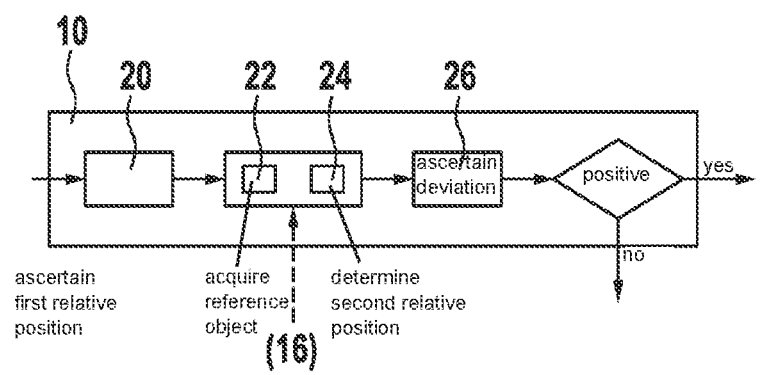
FIG. 2 shows a detail of the validation process, according to an example embodiment of the present invention.

FIG. 2 shows validation process 10 in greater detail. Here, first a first relative position of the calibration device relative to the vehicle is ascertained 20. Then, at least one reference object situated on the calibration device is acquired by the vehicle sensor 22. A second relative position is determined 24 from the acquisition data of the vehicle sensor. From the knowledge of both relative positions, a deviation is ascertained 26. If this deviation is within a predetermined tolerance, the result of this comparison and thus of the entire validation process 10 can be designated as positive. However, if the deviation is outside the tolerance, the validation process 10 is not positive. In the latter case, a complete calibration 16 is performed, which can likewise include the preceding steps 22 and 24.

Figure 3:
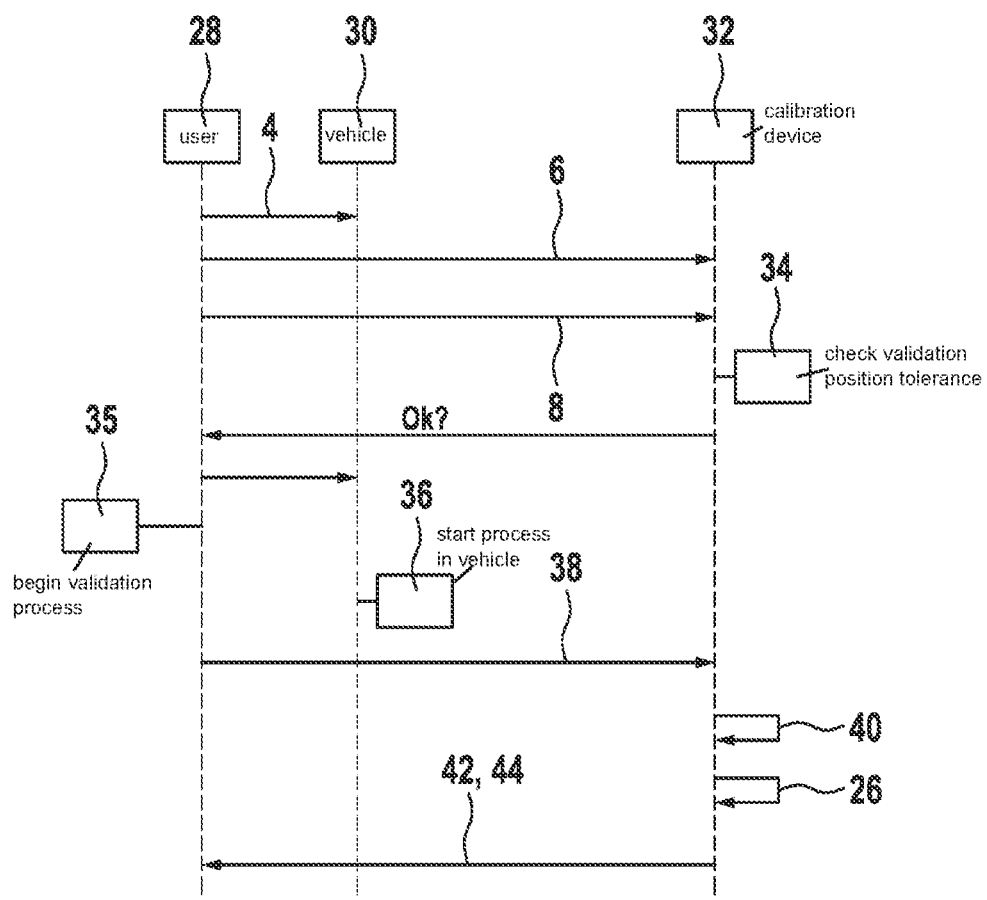
FIG. 3 shows a sequential representation of the validation process, according to an example embodiment of the present invention.

FIG. 3 shows a validation sequence illustrating validation process 10. Here, a user 28, a vehicle 30, and a calibration device 32 are distinguished from one another and shown side by side. User 28 prepares 4 the vehicle. Calibration device 32 is then prepared 6 and a rough positioning 8 is made of calibration device 32 in front of vehicle 30 in the field of view of the vehicle sensor. A validation position tolerance is then checked 34, which for example limits the range of possible first relative positions so that calibration device 32 is in the field of view of the vehicle sensor. Once this has been achieved, validation process 10 can begin 35.

This can be carried out by starting a process 36 in vehicle 30 so that at least one reference object situated at calibration device 32 is acquired 30 there by the vehicle sensor. The acquired data are transmitted 38 for example to calibration device 32, which can include a control unit. The transmission can take place to another control unit situated outside calibration device 32. The data could be transformed 40 into an independent form useful for processing, so that the first relative position and the second relative position can be compared to one another. For example, a useful form can include an angle about a particular spatial or vehicle axis. The comparison 26 subsequently takes place.

Depending on the result, a release signal 42 or a calibration signal 44 is issued, with which either the vehicle is marked for release or a complete calibration, taking place according to the existing art, is initiated.

Figure 4:
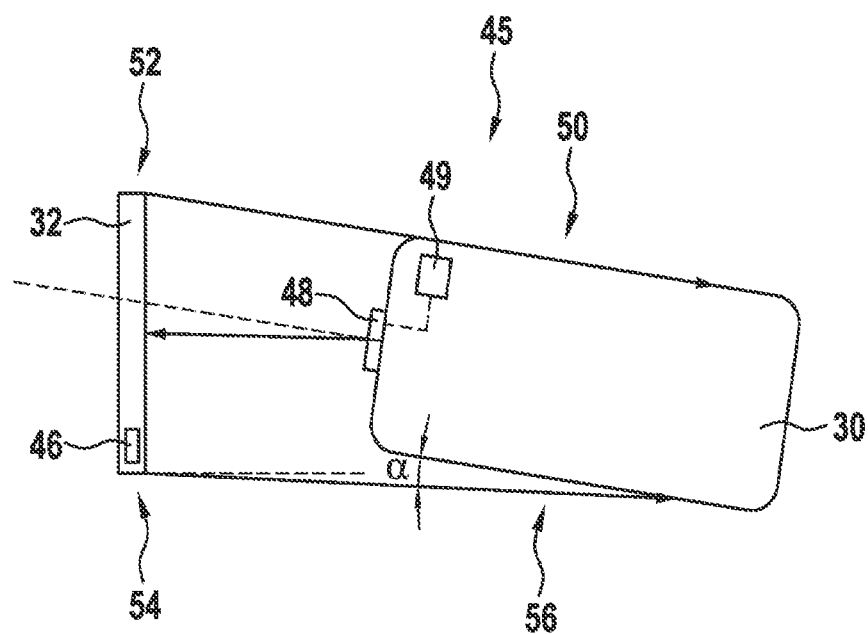
FIG. 4 shows a calibration system, according to an example embodiment of the present invention.

FIG. 4 shows a calibration system 45 with calibration device 32, which as an example is designed to acquire the first relative position of the calibration device relative to vehicle 30. For this purpose, a control unit 46 could for example be provided that carries out the position acquisition in conjunction with sensors not shown here. At the same time, vehicle 30 has at its front a vehicle sensor 48 that is to be calibrated. Vehicle sensor 48 can be connected to a vehicle control unit 49 that carries out the vehicle-bound part of validation process 10.

In validation process 10, in which vehicle 30 is roughly aligned with calibration device 32, a relative position is now ascertained based on vehicle sensor 48 and on calibration device 32. Here, as an example, a straight-line extension of vehicle right side 50 is shown aligned with a right end 52 of calibration device 32. However, a left end 54 of calibration device 32 encloses an angle $\alpha$ with a straight-line extension of vehicle left side 56. An average value between the angles at both vehicle sides 50 and 56 can be determined as a second relative position in the form of a position angle. This could be compared with an analogous position angle acquired by calibration device 32. If these two are identical within a predetermined tolerance, vehicle sensor 48 is sufficiently calibrated. Consequently, the complete calibration is not necessary.

Figure 5:
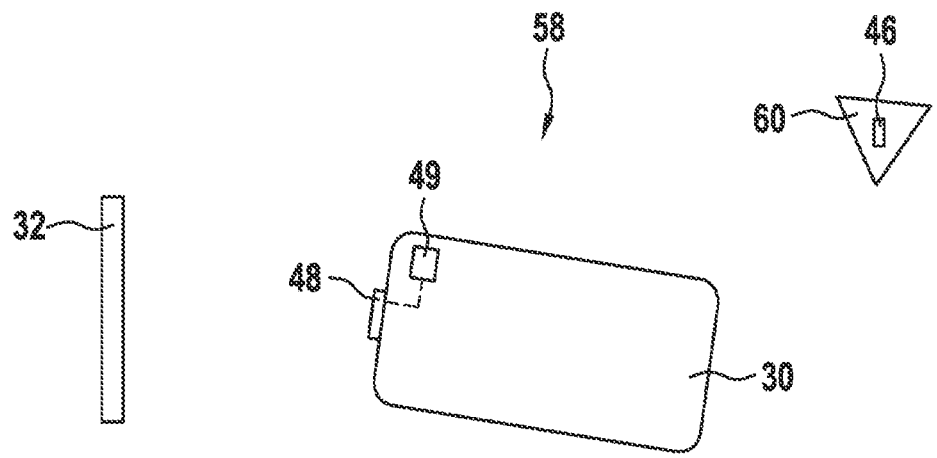
FIG. 5 shows an alternative calibration system, according to an example embodiment of the present invention.

FIG. 5 shows an alternative calibration system 58 in which calibration device 32 is fixedly positioned and is not designed to ascertain the first relative position. Instead, an external observation device 60 is used that ascertains the first relative position. This device could include for example a control unit 46 that controls or carries out the position acquisition. Calibration device 32 could in this way be significantly simplified.

What is claimed is:

1. A calibration method for a vehicle sensor, comprising the following steps:
   situating a calibration device such that at least one reference object is in a field of view of the vehicle sensor situated on a vehicle;
   ascertaining a first relative position of the calibration device relative to the vehicle by a measurement outside the vehicle;
   detecting the at least one reference object by the vehicle sensor, and determining a second relative position of the at least one reference object relative to the vehicle from sensor data acquired by the vehicle sensor when detecting the at least one reference object; and
   calculating a deviation between the first relative position and the second relative position;
   wherein the calibration method is terminated when the calculated deviation is within a predetermined tolerance, wherein a calibration of the vehicle sensor is carried out only when the calculated deviation exceeds the predetermined tolerance.

2. The calibration method as recited in claim 1, wherein the situating of the calibration device includes the coarse alignment of the at least one reference object completely in the field of view of the vehicle sensor.

3. The calibration method as recited in claim 1, wherein the detecting of the at least one reference object by the vehicle sensor includes maintaining of preset calibration data of the vehicle sensor.

4. The calibration method as recited in claim 1, wherein the ascertaining of the first relative position is performed by the calibration device.

5. The calibration method as recited in claim 1, wherein the ascertaining of the first relative position is performed by an additional observation device situated outside the calibration device and outside the vehicle.

6. The calibration method as recited in claim 1, wherein, before the ascertaining of the first relative position, the position of the vehicle is fixed and the vehicle is being prepared for calibration.

7. The calibration method as recited in claim 1, wherein a validation position tolerance between the calibration device and the vehicle is checked before the ascertaining of the first and second relative position, and, when there is a deviation of the validation position tolerance, a relative position between the vehicle and the calibration device is adjusted.

8. A calibration system for a vehicle sensor, comprising:
a calibration device such that at least one reference object is situated in a field of view of the vehicle sensor situated on a vehicle; and
at least one control unit capable of being coupled to the calibration device and to the vehicle sensor;
wherein the calibration device or an external observation device is configured to ascertain a first relative position of the calibration device relative to the vehicle by a measurement outside the vehicle, the vehicle sensor is configured to detect the at least one reference object by the vehicle sensor, the at least one control unit is configured to ascertain a second relative position of the at least one reference object relative to the vehicle from sensor data acquired by the vehicle sensor when detecting the at least one reference object and to calculate a deviation between the first relative position and the second relative position, and
the calibration system is configured to initiate a release signal to release the vehicle when the calculated deviation is already within a predetermined tolerance, and to carry out a calibration of the vehicle sensor only when the calculated deviation exceeds the predetermined tolerance.

9. The calibration system as recited in claim 8, wherein the at least one control unit is connectable to a vehicle control unit that is connected to the vehicle sensor, and the at least one control unit is configured to receive the acquired sensor data from the vehicle control unit.

10. The calibration system as recited in claim 8, wherein the at least one control unit is situated in the calibration device.

* * * * *